(12) United States Patent
Kalle (10) Patent No.: US 8,065,738 B1
(45) Date of Patent: Nov. 22, 2011

(54) SYSTEMS AND METHODS FOR DETECTING AUTOMATED SPAM PROGRAMS DESIGNED TO TRANSMIT UNAUTHORIZED ELECTRONIC MAIL VIA ENDPOINT MACHINES

(75) Inventor: Chandrasekhar Kalle, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 477 days.

(21) Appl. No.: 12/337,017

(22) Filed: Dec. 17, 2008

(51) Int. Cl.
*G06F 12/14* (2006.01)
(52) U.S. Cl. ............................... 726/24; 726/22; 726/23
(58) Field of Classification Search .................... 726/22, 726/23, 24
See application file for complete search history.

(56) References Cited

U.S. PATENT DOCUMENTS

2007/0118759 A1* 5/2007 Sheppard ...................... 713/188
2009/0064323 A1* 3/2009 Lin ................................. 726/22

* cited by examiner

*Primary Examiner* — Ellen Tran
(74) *Attorney, Agent, or Firm* — Advantedge Law Group (57) ABSTRACT

A computer-implemented method for detecting automated spam programs designed to transmit unauthorized electronic mail via endpoint machines may comprise: 1) monitoring electronic-mail traffic on an endpoint machine, 2) identifying a computer program on the endpoint machine that is responsible for at least a portion of the electronic-mail traffic on the endpoint machine, 3) accessing at least one rule for determining, based on characteristics of the program, whether the program comprises a spam program, and then 4) determining, by applying the rule to the program, whether the program comprises a spam program. Corresponding systems and computer-readable media are also disclosed.

13 Claims, 5 Drawing Sheets

SYSTEMS AND METHODS FOR DETECTING AUTOMATED SPAM PROGRAMS DESIGNED TO TRANSMIT UNAUTHORIZED ELECTRONIC MAIL VIA ENDPOINT MACHINES

BACKGROUND OF THE INVENTION

The number of unsolicited bulk emails (also known as "spam") transmitted via the Internet has grown consistently over the past decade, with some researchers estimating that more than 80% of email is spam. Spam emails annoy consumers, consume precious network bandwidth and resources, and, in some cases, may be used as a vehicle for committing fraud.

In analyzing the widespread problem of spurn, researchers have estimated that a majority of spam emails originate from spambots on unsuspecting consumer computer systems. A spambot is a malicious program that is delivered to vulnerable computers via exploits. Upon launching, the spambot waits for commands from a malicious programmer's command and control center. Upon receiving a command, the spambot uses the unsuspecting consumer's computer to generate and transmit spam emails as directed by the command and control center.

Researchers have estimated that there are over 10 million spambots in existence today. By using unsuspecting consumer's computers, malicious programmers are able to generate tremendous amounts of spam with minimal risk of detection. As such, the instant disclosure identifies a need for identifying and eliminating spam bets from unsuspecting consumer's computer systems.

BRIEF SUMMARY OF INVENTION

As will be described in greater detail below, the instant disclosure generally relates to systems and methods for detecting automated spam programs designed to transmit unsolicited and unauthorized electronic mail via endpoint machines. In one example, a method for performing such a function may comprise: 1) monitoring email traffic (e.g., incoming and outgoing email-protocol traffic, such as POP, IMAP, and SMTP traffic) on an endpoint machine, 2) identifying a computer program on the endpoint machine that is responsible for at least a portion of the email traffic on the endpoint machine, 3) accessing at least one rule for determining, based on the characteristics of the program, whether the program is a spam program, and then 4) determining, by applying the rule to the program, whether the program is a spam program.

Rules for determining whether a program is a spam program may be constructed in a variety of ways and based on a variety of criteria. Examples of criteria that may be used to construct such rules include: 1) whether a program generates outgoing emails without receiving incoming emails, 2) whether a program generates outgoing entails using an excessive number of sender addresses, 3) whether the program generates outgoing emails using an excessive number of SMTP servers, 4) whether the program generates outgoing entails without employing a visible user interface, 5) whether the program generates outgoing emails without making any file-system reads (as commonly occurs when legitimate email clients initialize their address books or access their sent-mail data stores), 6) whether the program participates in IRC communications or suspicious HTTP traffic prior to generating outgoing emails, 7) whether any outgoing entails generated by the program are rejected by legitimate SMTP servers (which may occur, for example, if a legitimate SMTP server determines that an outgoing email generated by the program is spam or is addressed to a nonexistent recipient), or any other criteria that may be useful in determining whether a program is a spam program. In some examples, the method may further comprise assigning weight values to one or more criteria.

If, by applying one or more rules to the program, the system determines that the program is being used to generate spam mails, then the system may perform a security operation on the program by, for example, removing the program from the endpoint machine, blocking the program from generating network activity, quarantining the program, or the like.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way or example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for detecting automated spam programs designed to transmit unauthorized electronic mail ("email") via endpoint machines. As used herein, the term "spam" or "spam email" may refer to unwanted or unsolicited bulk email. In addition, the phrase "spam program," as used herein, may refer to an automated computer program, such as a spambot, designed to assist in the sending of spam.

Figure 1:
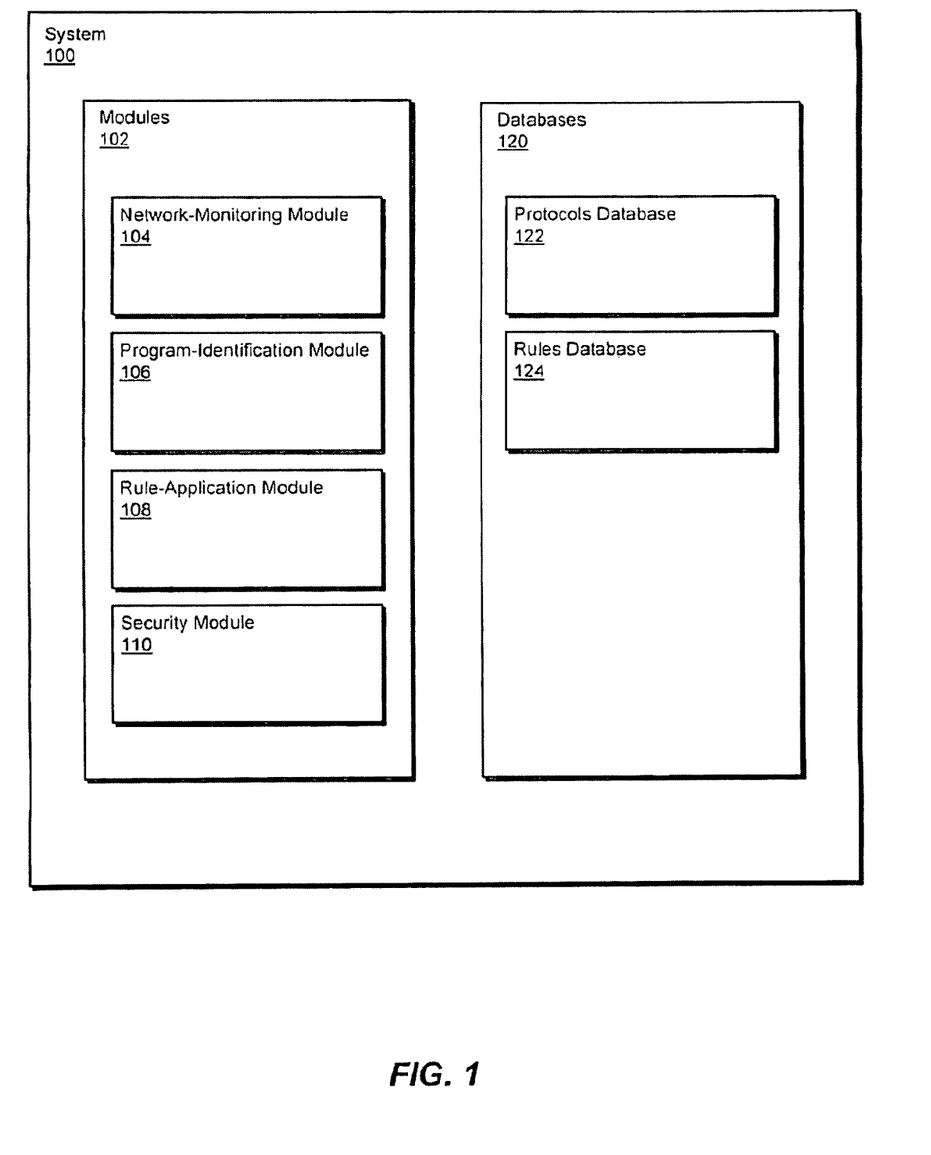
FIG. 1 is a block diagram of an exemplary system for detecting automated spam programs designed to transmit unauthorized electronic mail via endpoint machines.
Figure 2:
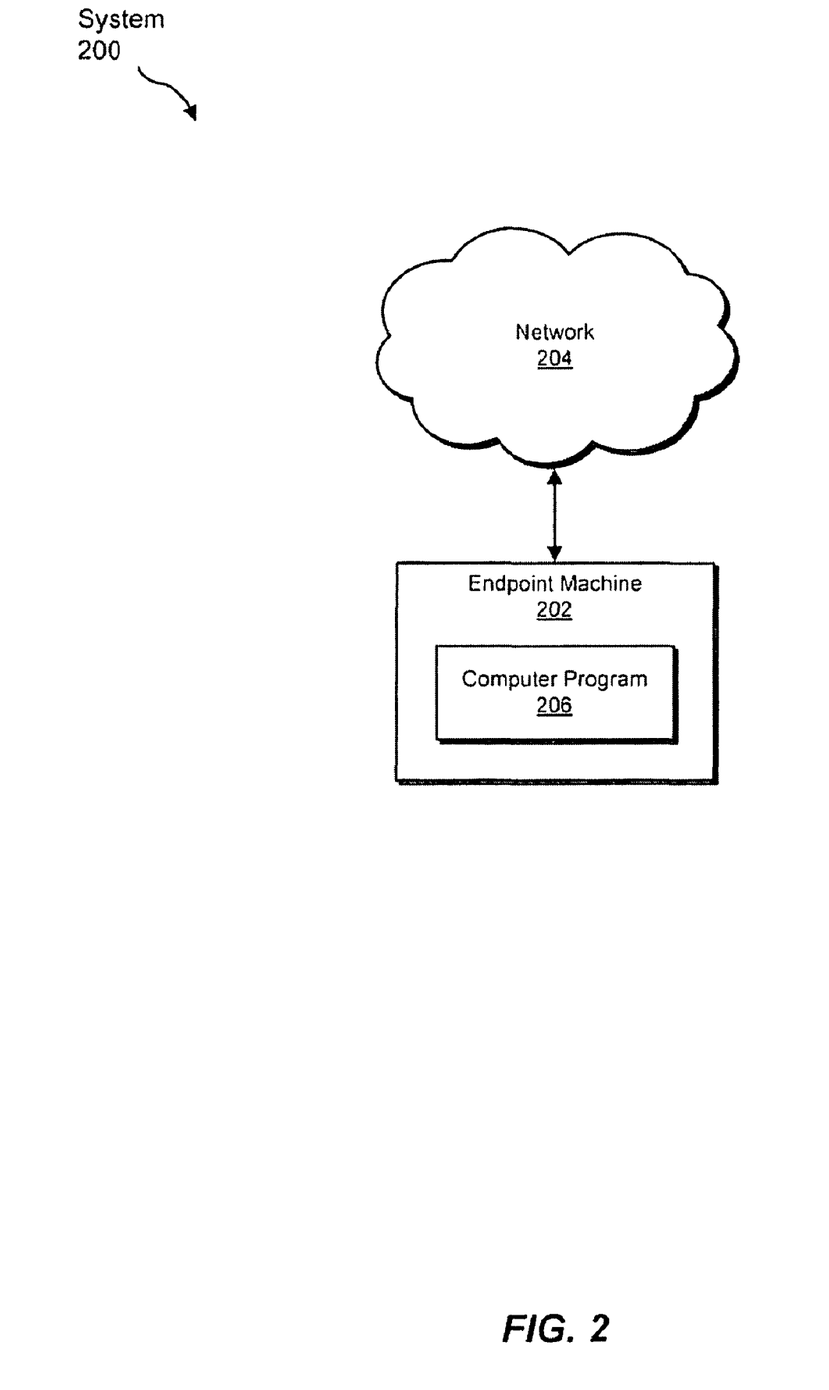
FIG. 2 is a block diagram of an exemplary system for detecting automated spam programs designed to transmit unauthorized electronic mail via endpoint machines.

The following will provide, with reference to FIGS. 1 and 2, detailed descriptions of exemplary systems for detecting automated spam programs designed to transmit unsolicited or unauthorized email via endpoint machines. A detailed description of a corresponding computer-implemented method will be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for detecting automated spam programs designed to transmit unsolicited or unauthorized electronic mail via endpoint machines. As illustrated in this figure, exemplary system 100 may comprise one or more modules 102 for performing one or more tasks. For example, as will be explained in greater detail below, exemplary system 100 may comprise a network-monitoring module 104 for monitoring email traffic on an endpoint machine. Exemplary system 100 may also comprise a program-identification module 106 for identifying a computer program on the endpoint machine that is responsible for at least a portion of the email traffic on the endpoint machine.

Exemplary system 100 may further comprise a rule-application module 108 for accessing and applying rules for determining, based on characteristics of the identified program, whether the program is a spurn program. In addition, exemplary system 100 may comprise a security module 110 for performing security operations on programs (such as removing or quarantining the program) that are identified as spam programs. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules configured to run on one or more computing devices, such as the devices illustrated in FIG. 2 (e.g., endpoint machine 202), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also comprise one or more databases 120. Databases 120 may represent portions of a single database or computing device or a plurality of databases or computing devices. In one embodiment, exemplary system 100 may comprise a protocols database 122 for storing digital signatures used to identify various mail protocols, such as POP3, IMAP4, and SMTP. Exemplary system 100 may also comprise a rules database 124 for storing rules or rule sets that contain criteria for determining, based on the characteristics of a program, whether the program is a spam program.

One or more of databases 120 in FIG. 1 may represent a portion of one or more computing devices. For example, one or more of databases 120 may represent a portion of one or more of the devices illustrated in FIG. 2 (e.g., endpoint machine 202), computing system 410 in FIG. 4, and/or portions of exemplary network architecture 500 in FIG. 5. Alternatively, one or more of databases 120 in FIG. 1 may represent one or more physically separate devices capable of being accessed by a computing device, such as endpoint machine 202 in FIG. 2, computing system 410 in FIG. 4, and/or portions of exemplary network architecture 500 in FIG. 5.

FIG. 2 is a block diagram of an exemplary system 200 for detecting automated spam programs designed to transmit unsolicited and unauthorized electronic mail via endpoint machines. As illustrated in this figure, exemplary system 200 may comprise an endpoint machine 202 in communication with a network 204.

Endpoint machine 202 generally represents any type or form of computing device capable of reading computer-executable instructions. Examples of endpoint machine 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device. In one example, endpoint machine 202 may comprise one or more computer programs, such as computer program 206 in FIG. 2.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g. GSM network), exemplary network architecture 500 in FIG. 5, or the like. Network 204 may facilitate communication or data transfer using wireless or wired connections. In one embodiment, network 204 may facilitate communication between endpoint machine 202 and additional computing systems.

Figure 3:
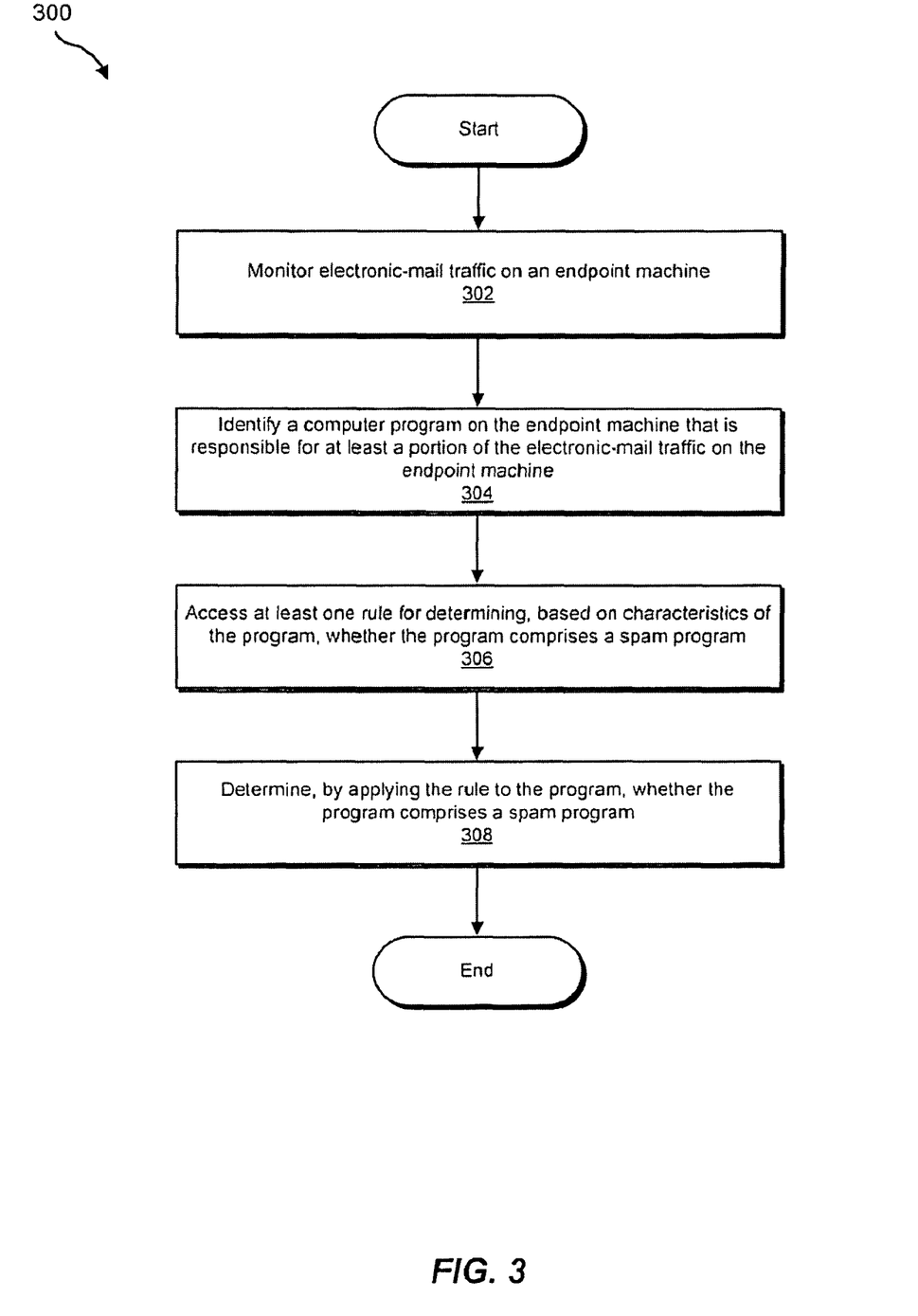
FIG. 3 is a flow diagram of an exemplary computer-implemented method for detecting automated spam programs designed to transmit unauthorized electronic mail via endpoint machines.

FIG. 3 is a flow diagram of an exemplary computer-implemented method 300 for detecting automated spam programs designed to transmit unsolicited and unauthorized email via endpoint machines. As illustrated in this figure, at step 302 the system may monitor email traffic on an endpoint machine. For example, network-monitoring module 104 in FIG. 1 may monitor email traffic on endpoint machine 202 in FIG. 2.

The phrase "email traffic" or "electronic-mail traffic," as used herein, generally refers to network activity associated with sending and receiving electronic mail. Examples of email traffic include, without limitation, incoming-mail-protocol traffic and outgoing-mail-protocol traffic. The phrase "incoming-mail-protocol traffic" may refer to network activity associated with incoming-mail protocols, such as POP3, IMAP4, MAPI/RPC, DIIOP, SMTP, or the like. Similarly, the phrase "outgoing-mail-protocol traffic" may refer to network activity associated with outgoing-mail protocols, such as SMTP.

The system may monitor email traffic on an endpoint machine in a variety of ways. In one example, network-monitoring module 104 in FIG. 1 may monitor email traffic on endpoint machine 202 in FIG. 2 by monitoring all network activity on endpoint machine 202, including all inbound and outbound network activity generated by applications on endpoint machine 202. Network-monitoring module 104 may then detect email traffic within the network activity on endpoint machine 202.

Network-monitoring module 104 in FIG. 1 may detect email traffic within network activity on an endpoint machine in a variety of ways. In one example, network-monitoring module 104 may detect email traffic within network activity by comparing the network activity on the endpoint machine with a database (such as protocols database 122 in FIG. 1) that contains digital signatures for known mail protocols.

In one example, network-monitoring module 104 in FIG. 1 may monitor email traffic on endpoint machine 202 in FIG. 2 by identifying and analyzing header information associated with the email traffic. For example, when network-monitoring module 104 detects incoming or outgoing email traffic within the overall network activity on endpoint machine 202, then network-monitoring module 104 may read and analyze the header information associated with the incoming and outgoing email traffic.

At step 304, the system may identify a computer program on the endpoint machine that it is responsible for at least a portion of the email traffic on the endpoint machine. For example, program-identification module 106 in FIG. 1 may determine that computer program 206 on endpoint machine 202 in FIG. 2 is responsible for at least a portion of the email traffic on endpoint machine 202.

The system may perform step 304 in a variety of ways. In one example, program-identification module 106 in FIG. 1 may identify computer programs that are responsible for email traffic by process name or ID, although additional embodiments are possible.

At step 306, the system may access at least one rule for determining, based on characteristics of the program identified in step 304, whether the program is a spam program. For example, rule-application module 108 in FIG. 1 may retrieve at least one rule from rules database 124 that contains criteria for determining, based on characteristics of computer program 206 in FIG. 2, whether computer program 206 is a spam program.

As detailed above, the rule or rules accessed in step 306 may comprise criteria for determining whether a program (or at least a portion of the program) is designed or is being used to transmit spun via endpoint machines. Examples of criteria that may be used by used by rules to determine whether a program is a spam program include, without limitation, whether the program generates outgoing email messages without receiving incoming email messages, whether the program generates more than a predetermined number of outgoing email messages without receiving any incoming email messages, whether the program generates outgoing email messages using multiple sender addresses or identities, whether the program generates outgoing email messages using more than a predetermined number of sender identities or addresses within a predetermined period of time, whether the program generates outgoing email messages using more than at predetermined number of outgoing-mail (e.g., SMTP) servers, whether the program generates outgoing email messages without employing a visual user interface, whether the program generates email messages without making any file-system reads (such as typically occur when traditional email client initialize their address books or retrieve sent mail), whether the program participates in IRC communications prior to generating outgoing email messages, whether the program participates in suspicious HTTP traffic prior to generating outgoing email messages, whether any outgoing email messages generated by the program are rejected by outgoing-mail servers, or any other criteria that may be used to determine whether a program is a spam program.

For example, a rule may stipulate that, since legitimate email clients traditionally only use between 1-3 SMTP servers, that if a program generates outgoing email messages using more than a predetermined number of SMTP servers (such as 10), then the program may represent a spam program. Similarly, since spam programs do not typically receive incoming email messages, a rule may stipulate that if a program generates more than a predetermined number of outgoing email messages (such as 100) without receiving any incoming email messages, then the program may be a spam program. A similar rule may also stipulate that if a program generates outgoing email messages using more than a predetermined number of sender identities or addresses (such as 50) within a short period of time (such as 12 hours), then the program may be a spam program.

Rules may also comprise criteria for determining whether a program is a spam program based on various characteristics of the program. For example, a rule may stipulate that if a program generates outgoing email messages without employing a visible user interface, then the program may be a spam program. Similarly, a rule may stipulate that if a program generates outgoing email messages without making any file-system reads (as is common when typical email clients initialize their address book or access sent mail), then the program may represent a spam program.

Rules may also comprise criteria for determining whether the program is a spam program based on whether the program is responsible for any non-email traffic. For example, a rule may stipulate that if a program participates in IRC communications or any suspicious HTTP traffic prior to generating outgoing email messages, then the program may be a spam program.

Rules may also comprise criteria for determining whether any outgoing email messages generated by a program are rejected by outgoing-mail servers. For example, if a program receives an incoming email message from a legitimate SMTP server that indicates that a message generated by the program was rejected (either because the message was identified as spam or because the recipient address specified in the email message was not located), then the system may determine that the program is a spam program.

in one example, the system may assign various weight values to one or more criteria. For example, the system may assign a low-weight value (e.g., 2, on a scale of 1 to 10) to criteria used to determine whether any outgoing email messages generated by the program are rejected by SMTP servers for specifying a recipient address that does not exist. Alternatively, the system may assign a high-weight value (e.g., 8, on a scale of 1 to 10) to criteria used to determine whether the program generates outgoing email messages without receiving any incoming email messages. In one example, the system may, by comparing the various characteristics of a program with their respective weight values, whether a program is likely a spam program.

Returning to FIG. 3, at step 308 the system may determine, by applying the rule to the program, whether the program is a spam program. For example, rule-application module 108 in FIG. 1 may apply the rule retrieved from rules database 124 in step 306 to computer program 206 on endpoint machine 202 in FIG. 2. Upon completion of step 308, exemplary method 300 in FIG. 3 may terminate.

If rule-application module 108 in FIG. 1 determines, in step 308, that the program is a spam program, then security module 110 in FIG. 1 may perform a security operation on the program. The phrase "security operation," as used herein, generally refers to any security operation that may be performed on a known spam program. Examples of security operations include, without limitation, removing the program from the endpoint machine, blocking the program from generating network activity, quarantining the program, transmitting a notification to a user or administrator that identifies the program as a security risk, or any other security operation that may be performed on known spam programs.

As detailed above, by developing and applying rules that identify various known characteristics of spam programs, the systems and methods disclosed herein may enable security vendors to quickly and accurately detect and eliminate spam programs on endpoint machines. As such, the systems and methods disclosed herein may provide a solution for combating the over 10 million spambot networks that are estimated to be connected to the Internet today.

Figure 4:
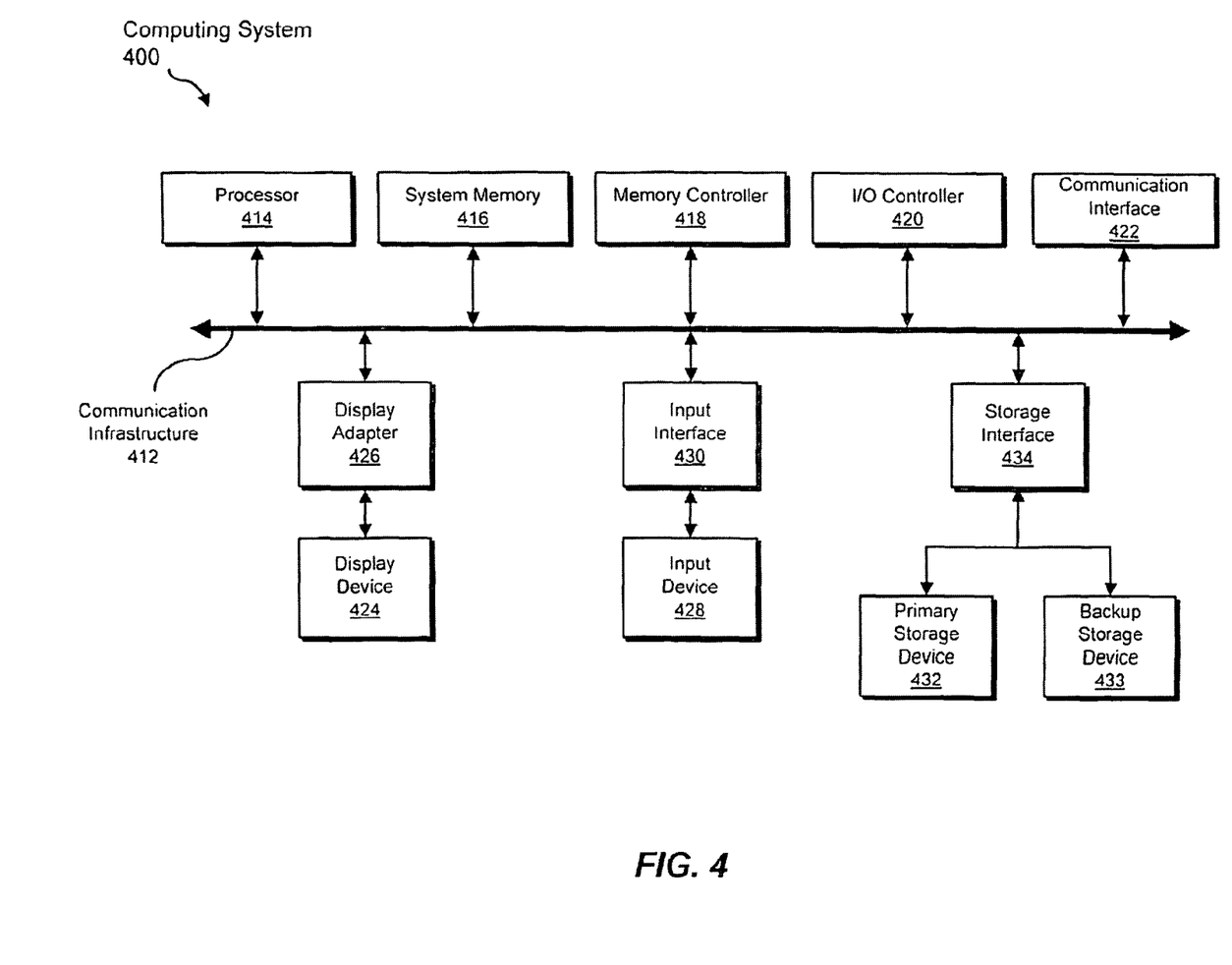
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may comprise at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the monitoring, identifying, accessing, determining, applying, detecting, comparing, assigning, performing, removing, blocking, quarantining, and transmitting described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may comprise both a volatile memory unit (such as, for example, system memory 416) and a non-volatile storage device (such as, for example, primary storage device 432, as described in detail below).

In certain embodiments, exemplary computing system 410 may also comprise one or more components or elements in addition to processor 414 and system memory 416. For example, as illustrated in FIG. 4, computing system 410 may comprise a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 41 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller may perform and/or be a means for performing, either alone or in combination with other elements, one or more of the steps or features described and/or illustrated herein, such as monitoring, identifying, accessing, determining, applying, detecting, comparing, assigning, performing, removing, blocking, quarantining, and transmitting.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the monitoring, identifying, accessing, determining, applying, detecting, comparing, assigning, performing, removing, blocking, quarantining, and transmitting steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network comprising additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

in certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 494 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interlace 422 may receive instructions from a remote device or send instructions to a remote device for execution. In certain embodiments, communication interface 422 may perform and/or be a means for performing, either alone or in combination with other elements, one or more of the monitoring, identifying, accessing, determining, applying, detecting, comparing, assigning, performing, removing, blocking, quarantining, and transmitting steps disclosed herein. Communication interface 422 may also be used to perform and/or be a means for performing other steps and features set forth in the instant disclosure.

As illustrated in FIG. 4, computing system 410 may also comprise at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also comprise at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the monitoring, identifying, accessing, determining, applying, detecting, comparing, assigning, performing, removing, blocking, quarantining, and transmitting steps disclosed herein. Input device 428 may also be used to perform and/or be a means for performing other steps and features set forth in the instant disclosure.

As illustrated in FIG. 4, exemplary computing system 410 may also comprise a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also comprise other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, the exemplary file systems disclosed herein may be stored on primary storage device 432, while the exemplary file-system backups disclosed herein may be stored on backup storage device 433. Storage devices 432 and 433 may also be used, for example, to perform and/or be a means for performing, either alone or in combination with other elements, one or more of the monitoring, identifying, accessing, determining, applying, detecting, comparing, assigning, performing, removing, blocking, quarantining, and transmitting steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
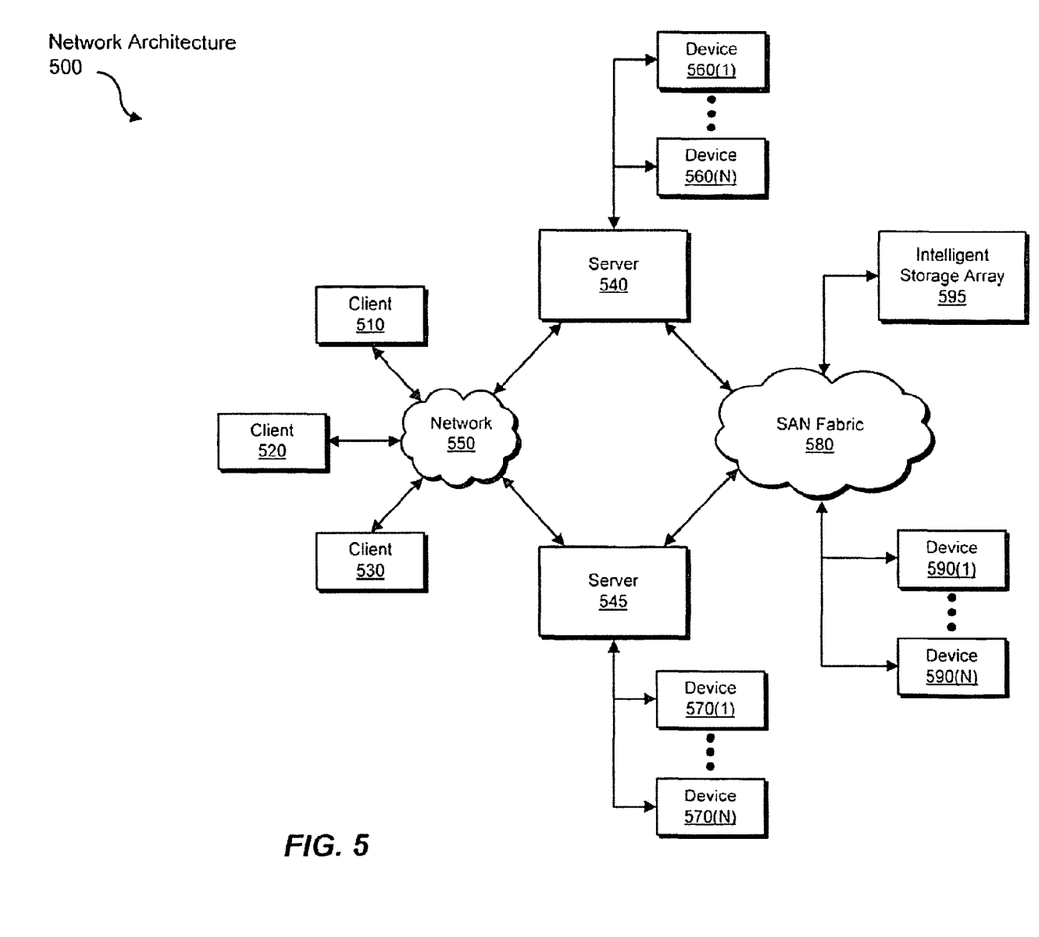
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the monitoring, identifying, accessing, determining, applying, detecting, comparing, assigning, performing, removing, blocking, quarantining, and transmitting steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for detecting automated spam programs designed to transmit unauthorized electronic mail via endpoint machines. Such a method may comprise: 1) monitoring email traffic on an endpoint machine, 2) identifying a computer program on the endpoint machine that is responsible for at least a portion of the email traffic on the endpoint machine, 3) accessing at least one rule for determining, based on characteristics of the program, whether the program comprises a spam program, and then 4) determining, by applying the rule to the program, whether the program comprises a spam program.

The email traffic may consist of incoming-mail-protocol traffic (such as POP, IMAP, MAPI/RPC, DIIOP, and SMTP protocol traffic) and outgoing-mail-protocol traffic (such as SMTP traffic). In one example, monitoring the email traffic may comprise monitoring all network activity on the endpoint machine and then detecting, within the network activity on the endpoint machine, the email traffic. The system may detect email traffic by detecting incoming and outgoing mail-protocol traffic within the network activity by comparing the network activity with digital signatures for incoming and outgoing mail protocols. In some examples, monitoring the email traffic may comprise monitoring header information associated with the email traffic.

The rule may comprise a variety of criteria, such as criteria for determining whether the program generates outgoing email messages without receiving incoming email messages, criteria for determining whether the program generates more than a predetermined number of outgoing email messages without receiving any incoming email messages, criteria for determining whether the program generates outgoing email messages, using multiple sender identities, criteria for determining whether the program generates outgoing email messages using more than a predetermined number of sender identities within a predetermined period of time, criteria for determining whether the program generates outgoing email messages using more than a predetermined number of outgoing-mail servers, criteria for determining whether the program generates outgoing email messages without employing a visible user interface, criteria for determining whether the program generates outgoing email messages without making any file-system reads, criteria for determining whether the program participates in IRC communications prior to generating outgoing email messages, criteria for determining whether the program participates in suspicious HTTP traffic prior to generating outgoing email messages, criteria for determining whether any outgoing email messages generated by the program are rejected by outgoing-mail servers, and/or any other criteria that may be useful in determining whether a program is a spam program. In certain embodiments, the method may further comprise assigning weight values to one or more of the criteria.

In one example, the method may also comprise determining that the program comprises a spam program and then performing a security operation. Examples of such security operations may include removing the program from the endpoint machine, blocking the program from generating network activity, quarantining the program, transmitting a notification that identifies the program as a security risk, or the like.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," us used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting automated spam programs designed to transmit unauthorized electronic mail via endpoint machines, at least a portion of the method being performed by an endpoint machine comprising at least one processor, the method comprising:
    monitoring, using a networking-monitoring module installed on the endpoint machine, electronic-mail traffic on the endpoint machine by:
        monitoring all network activity on the endpoint machine;
        detecting, within the network activity on the endpoint machine, the electronic-mail traffic by:
            detecting incoming-mail-protocol traffic within the network activity by comparing the network activity with digital signatures for incoming-mail protocols;
            detecting outgoing-mail-protocol traffic within the network activity by comparing the network activity with digital signatures for outgoing-mail protocols;
    identifying, using a program-identification module installed on the endpoint machine, a computer program on the endpoint machine that is responsible for at least a portion of the electronic-mail traffic on the endpoint machine;
    accessing, using a rule-application module installed on the endpoint machine, at least one rule for determining, based on characteristics of the program, whether the program comprises a spam program;
    determining, by applying the rule to the program using the rule-application module installed on the endpoint machine, that the program comprises a spam program designed to transmit unauthorized electronic mail via the endpoint machine;
    in response to the determination that the program comprises a spam program designed to transmit unauthorized electronic mail via the endpoint machine, using a security module installed on the endpoint machine to perform a security operation on the program.

2. The method of claim 1, wherein monitoring the electronic-mail traffic comprises monitoring header information associated with the electronic-mail traffic.

3. The method of claim 1, wherein the rule comprises at least one of:
    criteria for determining whether the program generates outgoing electronic-mail messages without receiving incoming electronic-mail messages;
    criteria for determining whether the program generates more than a predetermined number of outgoing electronic-mail messages without receiving any incoming electronic-mail messages;
    criteria for determining whether the program generates outgoing electronic-mail messages using multiple sender identities;
    criteria for determining whether the program generates outgoing electronic-mail messages using more than a predetermined number of sender identities within a predetermined period of time;
    criteria for determining whether the program generates outgoing electronic-mail messages using more than a predetermined number of outgoing-mail servers;
    criteria for determining whether the program generates outgoing electronic-mail messages without employing a visible user interface;
    criteria for determining whether the program generates outgoing electronic-mail messages without making any file-system reads;
    criteria for determining whether the program participates in IRC communications prior to generating outgoing electronic-mail messages;
    criteria for determining whether the program participates in suspicious HTTP traffic prior to generating outgoing electronic-mail messages;
    criteria for determining whether any outgoing electronic-mail messages generated by the program are rejected by outgoing-mail servers.

4. The method of claim 3, further comprising assigning weight values to at least one of the criteria.

5. The method of 1, wherein the security operation comprises at least one of:
    removing the program from the endpoint machine;
    blocking the program from generating network activity;
    quarantining the program;
    transmitting a notification that identifies the program as a security risk.

6. The method of claim 1, wherein the incoming-mail-protocol traffic comprises at least one of:
    POP traffic;
    IMAP traffic;
    MAPI/RPC traffic;
    DIIOP traffic;
    SMTP traffic.

7. The method of claim 1, wherein the outgoing-mail-protocol traffic comprises SMTP traffic.

8. A system for detecting automated spam programs designed to transmit unauthorized electronic mail via endpoint machines, the system comprising:
    a network-monitoring module installed on an endpoint machine comprising at least one processor, the networking-monitoring module being programmed to monitor electronic-mail traffic on the endpoint machine by:
        monitoring all network activity on the endpoint machine;
        detecting, within the network activity on the endpoint machine, the electronic-mail traffic by:
            detecting incoming-mail-protocol traffic within the network activity by comparing the network activity with digital signatures for incoming-mail protocols;
            detecting outgoing-mail-protocol traffic within the network activity by comparing the network activity with digital signatures for outgoing-mail protocols;
    a program-identification module installed on the endpoint machine, the program-identification module being programmed to identify a computer program on the endpoint machine that is responsible for at least a portion of the electronic-mail traffic on the endpoint machine;
    a rule-application module installed on the endpoint machine, the rule-application module being programmed to:

access at least one rule for determining, based on characteristics of the program, whether the program comprises a spam program;

determine, by applying the rule to the program, that the program comprises a spam program designed to transmit unauthorized electronic mail via the endpoint machine;

a security module installed on the endpoint machine, the security module being programmed to perform a security operation on the program in response to the determination that the program comprises a spam program designed to transmit unauthorized electronic mail via the endpoint machine.

9. The system of claim 8, wherein the network-monitoring module monitors the electronic-mail traffic by monitoring header information associated with the electronic-mail traffic.

10. The system of claim 8, wherein the rule comprises at least one of:

criteria for determining whether the program generates outgoing electronic-mail messages without receiving incoming electronic-mail messages;

criteria for determining whether the program generates more than a predetermined number of outgoing electronic-mail messages without receiving any incoming electronic-mail messages;

criteria for determining whether the program generates outgoing electronic-mail messages using multiple sender identities;

criteria for determining whether the program generates outgoing electronic-mail messages using more than a predetermined number of sender identities within a predetermined period of time;

criteria for determining whether the program generates outgoing electronic-mail messages using more than a predetermined number of outgoing-mail servers;

criteria for determining whether the program generates outgoing electronic-mail messages without employing a visible user interface;

criteria for determining whether the program generates outgoing electronic-mail messages without making any file-system reads;

criteria for determining whether the program participates in IRC communications prior to generating outgoing electronic-mail messages;

criteria for determining whether the program participates in suspicious HTTP traffic prior to generating outgoing electronic-mail messages;

criteria for determining whether any outgoing electronic-mail messages generated by the program are rejected by outgoing-mail servers.

11. The system of claim 10, wherein the rule-application module is further programmed to assign weight values to at least one of the criteria.

12. The system of claim 8, wherein the security operation comprises at least one of:

removing the program from the endpoint machine;
blocking the program from generating network activity;
quarantining the program;
transmitting a notification that identifies the program as a security risk.

13. A non-transitory computer-readable medium having thereon computer-executable instructions that, when executed by one or more processors of an endpoint machine, cause the endpoint machine to perform a method for detecting automated spam programs designed to transmit unauthorized electronic mail via endpoint machines, the method comprising:

monitoring, using a networking-module installed on the endpoint machine, electronic-mail traffic on the endpoint machine by:
  monitoring all network activity on the endpoint machine;
  detecting, within the network activity on the endpoint machine, the electronic-mail traffic by:
    detecting incoming-mail-protocol traffic within the network activity by comparing the network activity with digital signatures for incoming-mail protocols;
    detecting outgoing-mail-protocol traffic within the network activity by comparing the network activity with digital signatures for outgoing-mail protocols;

identifying, using a program-identification module installed on the endpoint machine, a computer program on the endpoint machine that is responsible for at least a portion of the electronic-mail traffic on the endpoint machine;

accessing, using a rule-application module installed on the endpoint machine, at least one rule for determining, based on characteristics of the program, whether the program comprises a spam program;

determining, by applying the rule to the program using the rule-application module installed on the endpoint machine, that the program comprises a spam program designed to transmit unauthorized electronic mail via the endpoint machine;

in response to the determination that the program comprises a spam program, using a security module installed on the endpoint machine to perform a security operation on the program.

* * * * *